United States Patent

[11] 3,624,410

[72] Inventor Eugene J. Bruckert
Chicago, Ill.
[21] Appl. No. 820,801
[22] Filed May 1, 1969
[45] Patented Nov. 30, 1971
[73] Assignee Motorola, Inc.
Franklin Park, Ill.

[54] BALANCED INTEGRATE AND DUMP CIRCUIT FOR MEASURING DUTY CYCLE OF A PULSE TRAIN
5 Claims, 1 Drawing Fig.
[52] U.S. Cl................................................. 307/234,
307/229, 307/232, 307/235, 324/78 R, 328/111, 328/127, 328/151
[51] Int. Cl......................................................... H03k 5/20
[50] Field of Search............................................ 307/231,
232, 233, 234, 236, 228, 229, 235; 328/111, 127, 118, 140, 135, 147, 151; 324/68 A, 78; 340/167, 170, 171

[56] References Cited
UNITED STATES PATENTS
| | | | |
|---|---|---|---|
| 3,048,708 | 8/1962 | Raver............................ | 307/293 |
| 3,441,874 | 4/1969 | Bennett......................... | 307/228 X |
| 3,210,558 | 10/1965 | Owen............................ | 307/228 |
| 3,375,501 | 3/1968 | McCutcheon et al. ....... | 328/151 X |
| 3,473,133 | 10/1969 | Hummel....................... | 307/233 X |

Primary Examiner—Stanley D. Miller, Jr.
Attorney—Mueller & Aichele

ABSTRACT: A balanced integrate and dump circuit includes a first integrator, differential amplifier, second integrator and timing circuit, for detecting the presence or absence of pulse train signals in a predetermined time interval, determining whether the pulse train signals are present for greater than a predetermined percentage of the time interval measured and resetting the circuit for the next measurement. Differential comparison of voltages representing the presence and absence of pulses in the measured time interval eliminates errors due to timing period variations, voltage variations, imperfect pulse train signals and circuit operating characteristics.

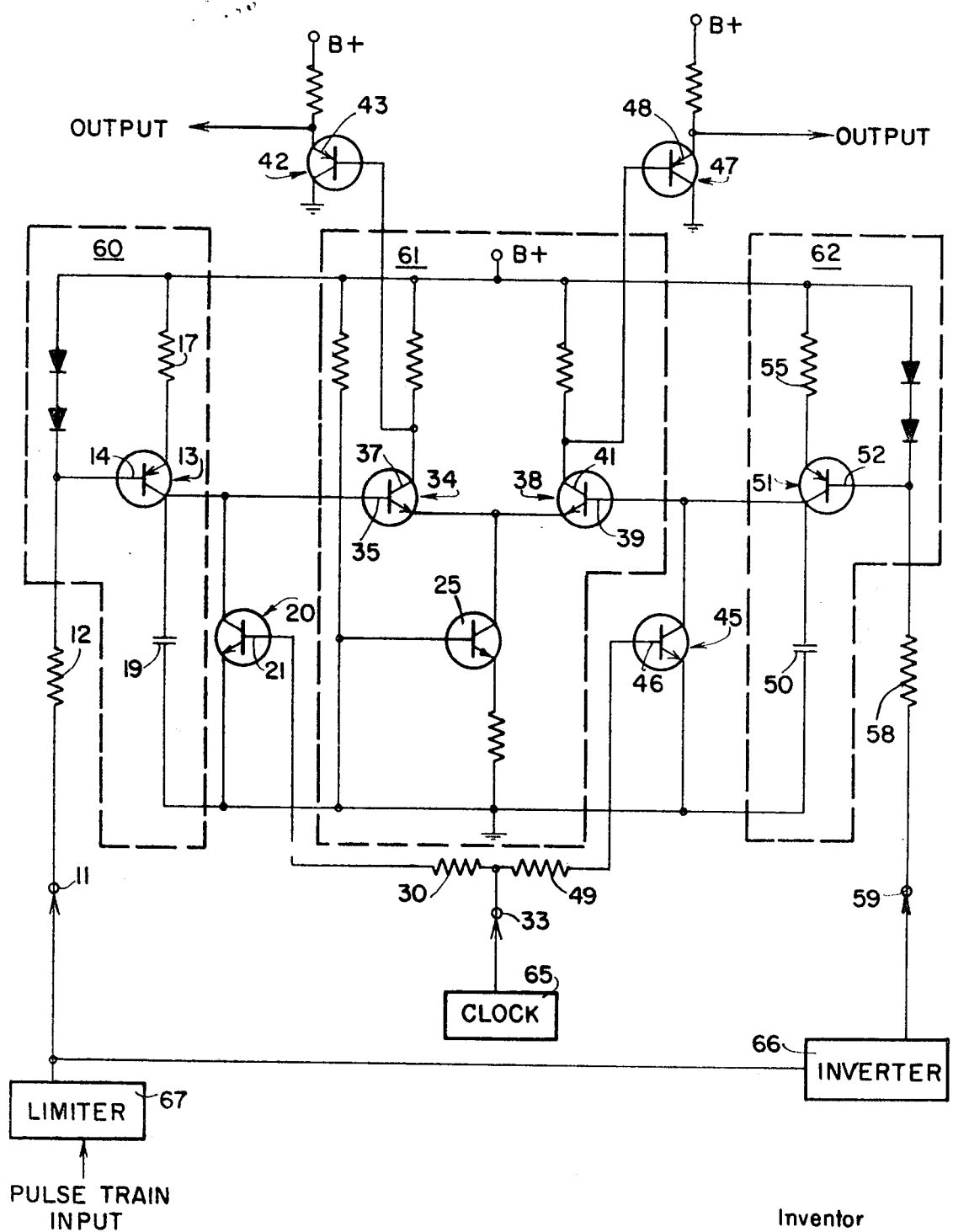

BALANCED INTEGRATE AND DUMP CIRCUIT FOR MEASURING DUTY CYCLE OF A PULSE TRAIN

BACKGROUND OF THE INVENTION

In communication systems it is often necessary to measure the duty cycle of a pulse train, having pulses of a predetermined maximum and minimum amplitude, in a predetermined period. An example of such use is in a digital communication system where information bits must be sensed in the presence of noise signals which tend to mask the presence of the information bits. The duty cycle of a pulse train, consisting of portions of the information bit not masked by the noise signal, and noise pulses, is measured for a time period equivalent to the length of an information bit. If the duty cycle of the pulse train exceeds 50 percent of the measured period, an information bit is assumed present. Integrate and dump circuits have been employed which integrate a pulse train to develop a voltage proportional to the duty cycle. The voltage is compared to a reference voltage of a desired value, representing a desired duty cycle, to provide an output function or voltage change, indicating whether the pulse train duty cycle exceeds or falls below the desired duty cycle. The desired reference voltage is provided by a resistor divider network or a diode, coupled to the reference input of a difference comparison device. This method of comparison has the disadvantage that changes in voltage levels due to supply voltage variation, or changes in operating characteristics of the circuit with temperature, cause a variation in the reference voltage which results in an erroneous comparison and output reading. Variations in the measured time interval and imperfect square wave signals having a finite rise and fall time create errors when the summed voltage is compared to a predetermined voltage, the value of which was determined based on a pulse with a predetermined amplitude, constant time period, and zero rise and fall time.

Balanced detector circuits which compare portions of pulse train signals have been designed to convert pulse train signals to a DC voltage that varies in proportion to the duty cycle of the pulse train. When used as an analog rather than digital circuit, the output variation is continuously monitored which precludes the use of the reset function of the comparison voltages. As an analog device, the integration circuit employed does not produce as close an approximation to a true integration function as is required in a digital circuit. Where the continuous variation in an average voltage is of interest, the integration voltage developed need not be held constant at the level established at the end of the last pulse train.

SUMMARY OF THE INVENTION

It is, therefore, an object of this invention to provide a balanced integrate and dump circuit which is less susceptable to errors due to a change in supply voltage levels.

Another object of this invention is to provide a balanced integrate and dump circuit which is less susceptable to errors due to a change in operating characteristics of the circuit with temperature changes.

Yet another object of the invention is to provide a balanced integrate and dump circuit which cancels errors due to variation in the rise and fall times of the square wave input signals.

A further object of the invention is to provide a balanced integrate and dump circuit which is not susceptable to error due to changes in the measured time intervals.

Another object of this invention is to provide a balanced integrate and dump circuit having circuitry which closely approximates a true integration function.

Yet another object of this invention is to provide a balanced integrate and dump circuit whose developed integration voltage remains constant, at the level established at the end of the last square wave in the pulse train, until the end of the measured time interval.

In practicing the invention, a balanced integrate and dump circuit is provided wherein, at a predetermined time, a clock circuit discharges voltages developed in two integrators. Pulse train signals of the pulse train to be measured which have a minimum and maximum amplitude are coupled to a first integrator to develop an integration voltage which is a function of the percentage of time the pulse train signals are at the minimum amplitude in the measured time interval. The pulse train is also inverted to produce a resultant pulse train which is coupled to a second integrator to develop an integration voltage which is a function of the percentage of time the resultant pulse train is at the minimum amplitude in the measured time interval. This is proportional to the amount of time the pulses of the original pulse train are at a maximum amplitude in the measured time interval. The integration voltages developed in the first and second integrators are then coupled to separate inputs of a differential amplifier. If the voltage developed in the first integrator exceeds the voltage developed in the second integrator, the voltage level at the first output of the differential amplifier will decrease. If the second integration voltage exceeds the first integration voltage, the voltage level at a second output of the differential amplifier will decrease. At the end of the measured time interval the voltage levels at the outputs of the differential amplifier indicate whether the first integration voltage exceeds the second integration voltage thereby indicating whether the pulse train was present for more than or less than a predetermined percentage of the measured time interval. At the same time the timing circuit resets, discharging the voltages developed in both integrators and starting a new measurement interval.

BRIEF DESCRIPTION OF THE DRAWING

The single FIGURE of the drawing is a combination schematic and block diagram of the balanced integrate and dump circuit of this invention.

DETAILED DESCRIPTION OF THE INVENTION

Referring to the drawing there is shown a balanced integrate and dump circuit including a first integrator 60, differential amplifier 61, second integrator 62, and a timing circuit consisting of transistors 20 and 45.

A clock pulse having a predetermined amplitude, period and repetition rate is coupled from a clock circuit 65 to bases 21 and 46 of transistors 20 and 45, through terminal 33 and resistors 30 and 49. The clock pulse biases transistors 20 and 45 to saturation thereby discharging integration capacitors 19 and 50 in integrators 60 and 62. This sets the basic timing of the circuit and resets the integrate and dump circuit. The pulse train which is to be measured, and which alternates between a constant amplitude positive voltage level and zero voltage, is coupled from limiter 67 to base 14 of transistor current source 13 through terminal 11 and resistor 12. The zero voltage portions of the pulse train cause transistor current source 13 to saturate allowing capacitor 19 to charge at a constant rate. The combination of transistor current source 13 and capacitor 19 will produce a very close approximation to an integration function.

The positive voltage portions of the pulse train will cause transistor current source 13 to be cut off. Voltage developed across capacitor 19 when transistor current source 13 is ON, is a function of the percentage of time that the zero voltage portions of the pulse train are present in the measured time interval.

Pulse train signals from limiter 67 are also coupled to inverter 66 where they are inverted to produce a resultant pulse train which is then coupled from inverter 66 to base 52 of transistor 51 through terminal 59 and resistor 58. The zero voltage portions of the resultant pulse train causes transistor current source 51 to saturate thereby charging capacitor 50 at a constant rate. The positive voltage portions of the resultant pulse train cause transistor current source 51 to be cut off. The voltage developed across capacitor 50 when transistor current source 51 is ON is a function of the percentage of time the zero voltage portion of the resultant pulse train is present in the measured time interval. This corresponds to the percentage of time that the positive voltage portions of the original pulse train are present in the measured time interval.

Capacitors 19 and 50 have no discharge path therefore the voltage developed across the capacitors when transistor current sources 13 and 51 are ON will remain constant until the transistor current sources are again turned on, further charging their respective capacitors, or until transistors 20 and 45 reset the circuit.

The voltages developed across capacitors 19 and 50 are coupled to bases 35 and 39 respectively of transistors 34 and 38 of differential amplifier 61. Transistor 25 in differential amplifier 61 acts as a current limiter for transistors 34 and 38.

If the voltage developed at base 35 of transistor 34 exceeds the voltage at base 39 of transistor 38, the voltage at collector 37 of transistor 34 will decrease below a predetermined level causing transistor 42 to be forward biased thereby reducing the voltage at emitter 43 of transistor 42 below a predetermined level. If the voltage developed at base 39 of transistor 38 exceeds the voltage developed at base 35 of transistor 34, the voltage at collector 41 of transistor 38 will decrease below a predetermined level causing transistor 47 to be forward biased thereby reducing the voltage at emitter 48 of transistor 47 below a predetermined level. At the end of the measured time interval the voltages at collector 37 of transistor 34 and collector 41 of transistor 38 indicate which capacitor, 19 or 50, has a greater voltage across it. This allows determination of whether the duty cycle of the pulse train was greater than or less than a predetermined desired duty cycle. At the same time, a clock pulse is again coupled to terminal 33 causing transistors 20 and 45 to saturate, discharging the voltages developed across capacitors 19 and 50, resetting the circuit, and starting a new measurement.

If transistor current sources 13 and 51 supply current to capacitors 19 and 50 at an identically constant rate, and transistor current sources 13 and 51 are each turned on for the same amount of time in the measured time interval, the voltages developed across capacitors 19 and 50 in integrators 60 and 62 at the end of the measured time interval will be equal. For transistor current sources 13 and 51 to be ON the same amount of time in the measured time interval, the duty cycle of the pulse train must be 50 percent of the measured time interval.

If it is desired to determine a different duty cycle of the pulse train the following formulas are used:

$$V_1 = (I_1 t_1)/C_1$$

$I_1$ = the current supplied by transistor current source 13 in integrator 60.
$V_1$ = the voltage developed across capacitor 19 in integrator 60.
$C_1$ = the capacitance of capacitor 19 in integrator 60.
$t_1$ = the time that the transistor current source 13 in integrator 60 is ON.

The second formula is:

$$V_2 = (I_2 t_2)/C_2$$

$I_2$ = the current supplied by transistor current source 51 in integrator 62.
$V_2$ = voltage developed across capacitor 50.
$t_2$ = the time that transistor current source 51 in integrator 62 is ON.
$C_2$ = the capacitance of capacitor 50 in integrator 62.

For example, if it is desired to determine whether the duty cycle of the pulse train is greater than three quarters of the measured time interval, the current sources are regulated so that at a time $t$, which represents the end of the measured time interval, the voltage developed on capacitors 19 and 50 will be equal and $t_1 = 3t/4$; $t_2 = t/4$.

Replacing $t_1$ and $t_2$ in equations 1 and 2 by their equivalent in terms of t, then:

$$(I_1 3t)/4c = V_1 = V_2 = I_2 t)/4C$$

and: $3I_1 = I_2$

The current from the transistor current source 51 must, therefore, equal three times the current from transistor current source 13. Values of resistors 17 and 55 may be varied to provide the required current. A corresponding equation may be used for any duty cycle measurement desired.

Thus, a balanced integrate and dump circuit has been shown. By this means a voltage comparison is made differentially whereas errors due to timing, period variation, voltage variation, imperfect square wave signals and the circuit operating characteristics are common mode and will be canceled in the differential amplifier circuit.

I claim:
1. An integrate and dump circuit for measuring the duty cycle of a pulse train, including in combination, input means adapted to receive the pulse train and to develop therefrom first and second trains of pulse signals with said second train of pulse signals being the inverse of said first train of pulse signals, first and second integration means each coupled to said input means and having a transistor biased to conduct in response to a voltage exceeding a predetermined level, timing means coupled to said first and second integration means for developing a timing signal to reset said first and second integration means to a reference voltage after a predetermined time period, said first integration means being responsive to said first train of pulse signals during said predetermined period to develop and maintain a first voltage proportional to the duty cycle of the first train of pulse signals, said second integration means being responsive to said second train of pulse signals during said predetermined period to develop and maintain a second voltage proportional to the duty cycle of the second pulse train, difference comparison means including transistor current limiting means coupled to said first and second integration means and responsive to said first and second voltages to develop a comparison signal indicating which of said first and second voltages is greater.

2. The integrate and dump circuit of claim 1 wherein said difference comparison means includes a differential amplifier, said differential amplifier having a first input coupled to said first integration means and a second input coupled to said second integration means, said transistor current limiting means being coupled to said differential amplifier for limiting the current therethrough, said differential amplifier comparing said first and second voltages and developing a signal indicating which of said first and second voltages is greater, thereby determining whether the duty cycle of the pulse train exceeds a predetermined percentage of the predetermined period.

3. The integrate and dump circuit of claim 1 wherein said transistors of said first and second integration means each forms current source means responsive to its particular train of pulse signals and including reactance means coupled to said current source means, said current source means and reactance means acting in combination to develop a voltage from said particular train of pulse signals which is a function of the duty cycle of said particular train of pulse signals.

4. The integrate and dump circuit of claim 1 wherein said transistors of said first and second integration means each forms transistor current source means, each of said transistor current source means having a control electrode adapted to receive said particular train of pulse signals, a capacitor coupled to said transistor current source means, said current source means and capacitor means acting in combination to develop a voltage from said particular train of pulse signals which is a function of the duty cycle of said particular train of pulse signals.

5. The integrate and dump circuit of claim 1, wherein said timing means includes clock means, a first transistor having a first electrode coupled to said first integration means, a second electrode coupled to a reference potential and a control electrode coupled to said clock means, a second transistor having a first electrode coupled to said second integration means, a second electrode coupled to said reference potential and a control electrode coupled to said clock means, said first and second transistors being responsive to said timing signal to reset said first and second integration means after a predetermined period of time.

* * * * *